Jan. 18, 1966 R. J. LIPPMANN 3,230,060
GLASS FEEDING

Filed Dec. 4, 1961 2 Sheets-Sheet 1

INVENTOR.
RAYMOND J. LIPPMANN
BY W. A. Schaich &
D. T. Irwin
ATTORNEYS

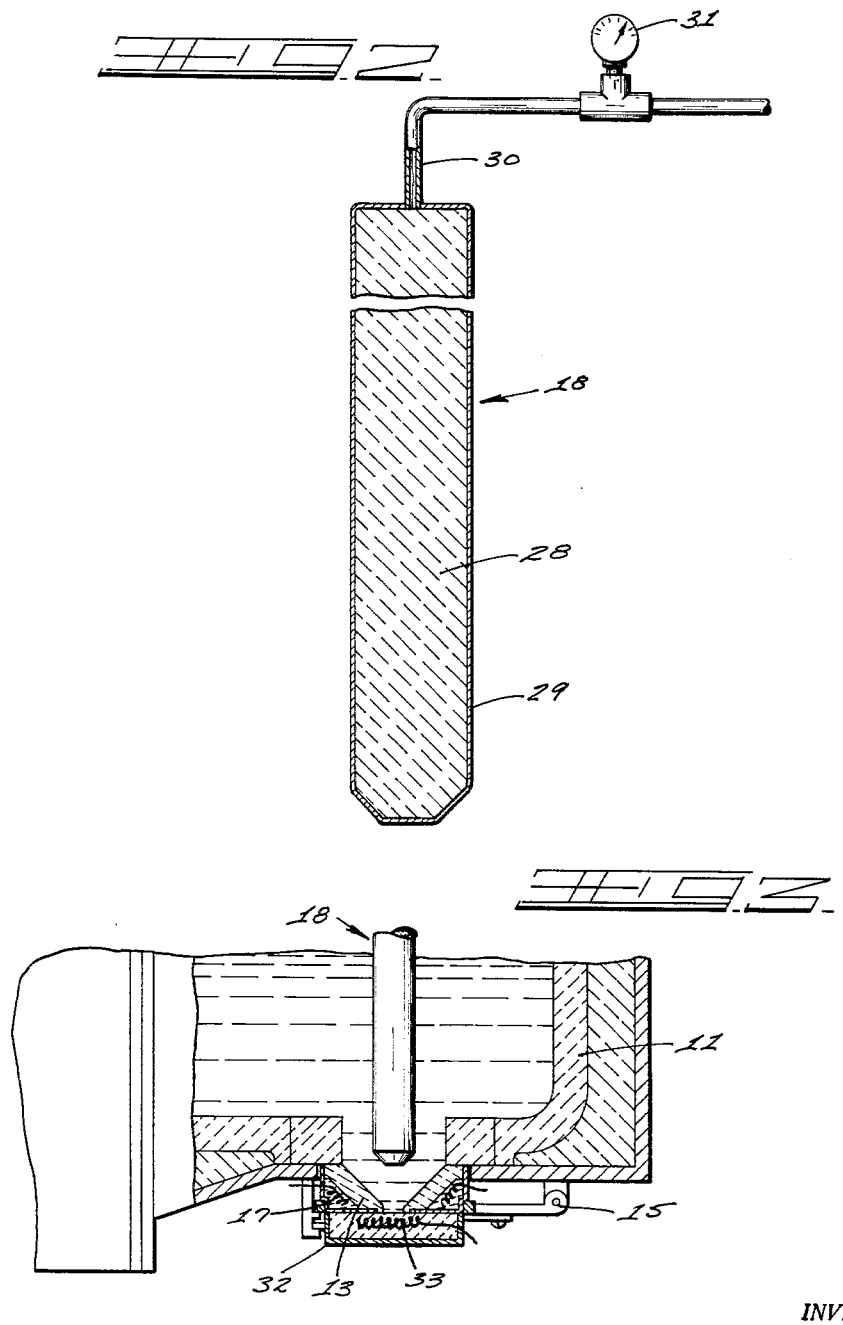

3,230,060
Patented Jan. 18, 1966

3,230,060
GLASS FEEDING
Raymond J. Lippmann, Toledo, Ohio, assignor to Owens-Illinois Glass Company, a corporation of Ohio
Filed Dec. 4, 1961, Ser. No. 156,894
9 Claims. (Cl. 65—32)

This invention relates to a method and apparatus for feeding molten glass at elevated temperatures. More particularly, this invention relates to an improved method and apparatus for feeding molten glass in which the feeder plunger is protected from oxidation.

In the manufacture of glass products from molten glass, particularly those glasses which have high silica content, it is frequently necessary that the molten glass temperature be maintained as high as 2800° F. or higher. Presently used apparatus which is in contact with the molten glass is subject to deformation after continuous use for relatively short periods of time due to chemical attack or to various mechanical or erosion phenomenon. Thus it is essential that the glass contacting metallic parts be made of a material which combines certain essential properties. The material must have high corrosion resistance to the chemical and mechanical attack of the flowing glass in order to provide a long operating life for the expensive apparatus and to insure a uniformity of structure and dimension of the glass products.

The material must be capable of withstanding high operating temperature without volatilizing in order to insure a high degree of fluidity of the flowing glass and greater freedom from strain within the glass products. The material must also be able to resist oxidation and not chemically combine with the glass to alter the composition of the glass.

In the past it has been the practice to coat or sheath the glass contacting members with platinum rhodium alloy which is extremely resistant to chemical attack by the glass at high temperatures. However, it has been observed, particularly in the case of feeder plungers which necessarily are immersed throughout a portion of their length in the molten glass for considerable periods of time, that a platinum rhodium alloy sheath will tend to sag away from the plunger core. This characteristic of the platinum rhodium sheath is more pronounced when the plunger is maintained within a body of molten glass at a temperature in the neighborhood of 2800° F.

With the foregoing in mind it is an object of this invention to provide glass manufacturing equipment which is highly resistant to chemical and physical attack by molten glass.

It is a further object of this invention to provide glass contacting members which are capable of withstanding very high operating temperatures.

It is an additional object of this invention to provide a method and apparatus for protecting a member which is maintained immersed in molten glass at high temperatures over a long period of time.

It is a still further object of this invention to provide a plunger having a platinum alloy sheath clad to its outer surface and having means for maintaining the sheath in intimate contact with the plunger body.

Further objects and advantages will be apparent from a consideration of the following disclosure taken in connection with the drawings in which:

FIG. 2 is an enlarged vertical sectional view through the feeder plunger of the invention, and FIG. 3 is a view similar to FIG. 1 illustrating a capped orifice with the plunger in its raised position.

Figure 1:
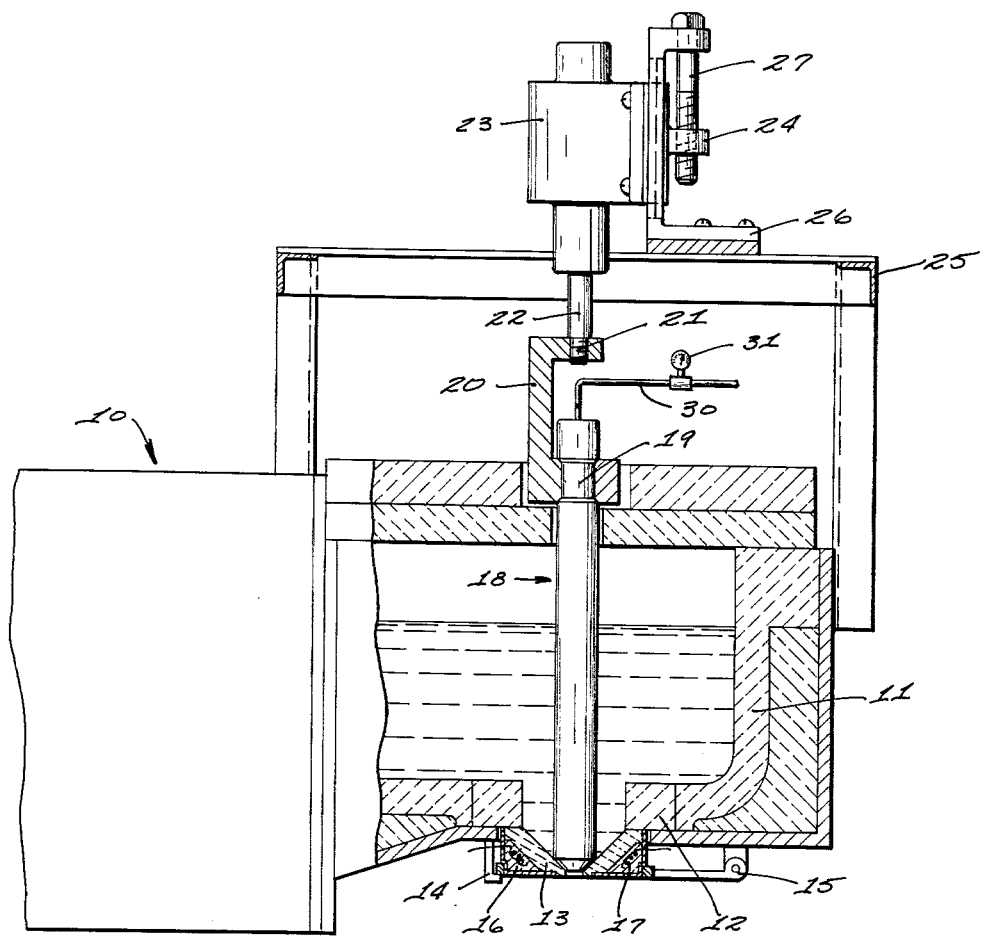
FIG. 1 is a side elevation partly in section of a molten glass feeder.

Referring to FIG. 1 there is shown the end portion of a forehearth 10. The forehearth terminates in a glass retaining spout or bowl 11 within which molten glass is supplied by a flow from the forehearth. The spout or blow 11 has a spout insert 12 in the bottom thereof at its center. The spout insert 12 serves as a well from which molten glass will flow by gravity through an annular orifice 13 positioned below in axial alignment with the spout insert 12. The refractory orifice 13 is held in sealing engagement with the bottom of the spout insert by means of a conventional clamping member 14. The clamping member engages the orifice member 13 at one side thereof while the opposite side of the orifice member is pivotally connected at 15 to a bracket formed on the lower surface of the forehearth 10. The orifice member 13 is usually surrounded by a ramming mixture 16 and has imbedded within this ramming mixture electric heating elements 17. The heater elements 17 are provided to maintain the orifice member 13 at a controllable elevated temperature and also to aid in freeing frozen glass at the start up of the furnace. Positioned vertically above and in axial alignment with the orifice 13 is a feeder plunger or needle 18. The plunger body 18 has a reduced portion 19 adjacent the top thereof which is engaged by a generally C-shaped bracket 20. The upper portion of the C-shaped bracket 20 receives the threaded end 21 of a piston rod 22 which extends vertically downward out of a hydraulic motor 23. The motor 23 is fixed to a vertically shiftable bracket 24. Above the spout or bowl 11 is a framework 25 which carries or supports an L-shaped member 26. The member 26 has slideways in its vertical portion within which the motor support bracket 24 is vertically slidable and also supports the head end of an adjusting screw 27. The screw 27 is provided with threads which cooperate with a tapped portion of the bracket 24.

Thus it can be seen that by rotation of the screw 27 the vertical position of the bracket 24 and motor 23 may be adjusted. The function of the motor 23 is to raise and lower the plunger or needle 18 with respect to the orifice member 13 for opening and closing the orifice. In this manner the plunger or needle 18 serves as a valving member and in normal operation will be raised and lowered at regular intervals to permit measured quantities of molten glass to flow out through the orifice.

Referring now to FIG. 2 it can be seen that the plunger 18 is composed of a core or main body portion 28. This core is preferably formed of a material which is mechanically or physically resistant to dimensional changes under extreme or high temperature conditions, as an example, the material may be molybdenum. The core or main body portion 28 is sheathed in a material 29 which is inert with respect to molten glass at high temperatures. An example of such a material would be an alloy of 80% platinum and 20% rhodium. A platinum rhodium alloy sheath covers the entire outer surface of the molybdenum core 28 and at the upper end thereof the sheath has welded thereto a platinum tube 30 whose bore is in communication with the interior of the sheath 29. The tube 30 is adapted to be connected to a source of vacuum and has a vacuum gauge 31 connected thereto.

The material 29 which forms the sheath for the plunger core 28 is resistant to chemical attack by the molten glass and, at relatively high temperatures when the material is a platinum rhodium alloy, it becomes somewhat soft and will tend to sag away from the molybdenum core 28. Therefore, through the application of a vacuum to the interior of the sheath 29, this sheath is prevented from sagging and will remain in intimate contact with the molybdenum core.

The core 28 which has been described, as, for example, being formed of molybdenum, is covered by the platinum rhodium alloy 29 either by preforming the sheath and then putting the core into the sheath or welding pieces of the sheath together in situ on the core. This sheath, for example, has a thickness of .04" and in order to completely cover the core 28, it is cut from sheet material in varying sizes and the pieces are welded together to form a complete, enclosing sheath. The platinum tube 30 is welded to the sheath to maintain a tight seal thereto. The core 28 is chosen from a material which is physically stable under high temperature conditions and as described in this case is made of molybdenum, however, molybdenum, if unprotected when inserted in the molten glass, will be attacked by the glass and also will discolor the molten bath. Thus it is necessary that the molybdenum core be protected by sheath material which is resistant to attack from the molten glass at a high temperature to which it will be subjected.

An additional feature with respect to the application of a vacuum to maintain the sheath in contact with the plunger core is that by providing a gauge in the vacuum line a sheath point indication is provided and a standard or controlled amount of vacuum may be applied to the interior of the sheath. Furthermore, in the event that the sheath becomes damaged and an opening is formed in the sheath, the vacuum gauge 31 will immediately indicate a loss of vacuum thus providing an indication that the molybdenum core will be subjected to attack by the molten glass.

As previously stated when the molten glass makes contact with the molybdenum it will contaminate the molten glass and actually discolor the glass. The provision of an indicating means for providing a signal or indication of when the protective sheath has failed is a distinct advantage. With the utilization of a vacuum to maintain the sheath in contact with the core and the inclusion of a vacuum gauge in the line to the plunger, applicant is able to determine when the protective sheath has failed.

While the above description has been directed toward the proposition of applying a vacuum continually to the interior of the sheath 29, it should be pointed out that this vacuum may be applied prior to the operation of the plunger and then seal off the tube 30. In this manner the vacuum will be maintained as long as the sheath does not become damaged. Furthermore, the closing off or sealing of the tube 30 could be advantageously accomplished by pinching off or sealing the tube with the vacuum gauge still connected to the portion of the tube which will remain in communication with the interior of the sheath. In this manner after the initial vacuum has been applied and the tube sealed off the operator, by observing the reading of the vacuum gauge, would be apprised of a loss of vacuum caused by damage of the sheath, merely by observing an increase in pressure in the vacuum gauge reading.

With reference to FIG. 3 the plunger 18 is shown raised from the orifice member 13 to the position that it would assume at the time that the feeder delivering glass is first started up and just prior to the removal of a closure cap 32. As previously described, the range of temperatures which the plunger and orifice will be subjected to in the normal operation of the feeder will be near 2800° F. The invention is of particular advantage in those situations where the molten glass is of a composition which has a very short range of working temperature and devitrification occurs when the temperature of the glass falls below 2500–2700° F.

It is advantageous to have electric heaters surrounding the orifice member itself and also use an electrically heated cap. As shown in FIG. 3 the cap 32 carries a heating coil 33 imbedded within its insulating structure. At the time that the feeder is being started up both the heating coils 17 and 32 are energized with sufficient power to remelt glass which has become solidified within the orifice member 13. After sufficient heat has been applied by these heater coils, the plunger 18 will be free to move to the position shown in FIG. 3 and at substantially the same time the cap 32 is removed from the bottom of the feeder orifice and the flow of glass will begin. Once the glass is in a flowable condition and is flowing through the orifice member 13, its rate of flow is controlled by the alternate raising and lowering of the plunger 18 so as to deliver discrete mold charges of predetermined quantity.

Thus it can be seen that applicant has provided a method and apparatus for protecting a feeder plunger or needle which results in a shorter plunger construction.

Various modifications may be resorted to within the spirit and scope of the appended claims.

I claim.

1. The method of protecting a rigid member which is maintained immersed in molten glass at high temperatures, comprising the steps of applying a sheath of oxidation-resistant material to fully encapsulate said member and applying a vacuum to the area between the sheath material and the member whereby the sheath material is prevented from sagging away from the member during contact with the high temperature molten glass.

2. In the method of protecting a molten glass contacting member as set forth in claim 1 further including the step of sealing off the external sheath after applying the vacuum thereto.

3. The method of protecting a rigid member which is brought into contactual relationship with molten glass at high temperatures, comprising the steps of applying an imperforate sheath of oxidation-resistant material to said member to completely enclose said member and continuously applying a vacuum to the area between the sheath material and the member whereby the sheath material is prevented from sagging away from the member during contact with the high temperature molten glass.

4. In the method of feeding molten glass at high temperatures through an orifice, the steps of entirely covering a glass contacting feeder plunger with a material having superior heat resistant and chemical stability properties in the presence of molten glass, and applying a vacuum to the interior of said covering material to prevent sagging of the material from the surface of said part.

5. In apparatus for feeding molten glass at high temperatures of the order of 2800° F. by gravity flow through an orifice wherein the orifice is opened and closed by the positioning of a plunger into and out of seating engagement therewith, the improvement comprising a plunger having a metallic alloy sheet clad to its entire outer surface and means for applying a vacuum to the area between the plunger body and the metallic alloy cladding, whereby the alloy cladding is prevented from sagging away from the plunger core during use.

6. In the manufacture and handling of glass, a part required to be in direct contactual relation with molten glass in such a state that the glass is capable of flowing, said part being clad with an alloy of platinum and rhodium and means for vacuumizing the area of contact between said part and said platinum alloy, whereby said alloy is prevented from sagging away from said part.

7. The apparatus as defined in claim 6 wherein the means for vacuumizing the area of contact between said part and said platinum alloy is effective to continuously apply said vacuum.

8. Apparatus for feeding segregated mold charges from a source of molten glass comprising a feed chamber having a feed orifice, a vertically adjustable plunger submerged in the glass above the feed orifice to control the rate of flow of glass from said orifice, said plunger being solid and clad with .04" thick platinum alloy sheet, a tube welded to the end of said plunger in communication with the refractory portion of the plunger, means for applying a vacuum to said tube, a vacuum gauge connected to said tube whereby an indication of loss of vacuum by said gauge will indicate a break in said platinum alloy cladding.

9. A plunger for immersion in a body molten glass at high temperatures comprising a molybdenum core, a non-corrosive alloy sheath completely enclosing said molybdenum core, a tube welded to the hollow sheath and communicating with the area intermediate the core and sheath, whereby vacuum may be applied to said area through said tube to permanently prevent the alloy sheath from sagging away from the molybdenum core.

References Cited by the Examiner
UNITED STATES PATENTS

| | | | |
|---|---|---|---|
| 1,395,963 | 11/1921 | Kuppers | 65—59 |
| 2,457,218 | 12/1948 | Ferrell | 65—59 X |
| 2,654,184 | 10/1953 | Pieler | 65—326 X |
| 2,803,925 | 8/1957 | Klausmann | 65—374 |

DONALD H. SYLVESTER, *Primary Examiner.*